(12) United States Patent
Suzuki (10) Patent No.: US 7,584,662 B2
(45) Date of Patent: *Sep. 8, 2009

(54) ELECTROSTATIC-CAPACITY-TYPE ACCELERATION SENSOR AND ACCELERATION MEASURING DEVICE THEREWITH

(75) Inventor: Tamito Suzuki, Shizuoka-Ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/798,899

(22) Filed: May 17, 2007

(65) Prior Publication Data

US 2007/0220975 A1 Sep. 27, 2007

Related U.S. Application Data

(60) Continuation of application No. 11/210,966, filed on Aug. 25, 2005, now Pat. No. 7,434,463, which is a division of application No. 10/790,440, filed on Mar. 1, 2004, now Pat. No. 7,004,027.

(30) Foreign Application Priority Data

Mar. 3, 2003 (JP) ............................. 2003-55562

(51) Int. Cl.
*G01P 15/125* (2006.01)
(52) U.S. Cl. .................................................. 73/514.32
(58) Field of Classification Search .............. 73/514.32, 73/514.01, 514.16, 514.21, 514.17, 514.18; 324/660; 361/280, 283.1
See application file for complete search history.

(56) References Cited

U.S. PATENT DOCUMENTS

| | | | |
|---|---|---|---|
| 4,711,128 A | 12/1987 | Boura et al. | 73/514.18 |
| 5,151,763 A | 9/1992 | Marek et al. | 257/415 |
| 5,337,606 A | 8/1994 | Bennett et al. | |
| 5,618,989 A | 4/1997 | Marek et al. | 73/1.38 |
| 5,631,422 A | 5/1997 | Sulzberger et al. | 73/514.32 |
| 6,041,653 A | 3/2000 | Ichikawa et al. | 73/514.32 |
| 6,744,258 B2 | 6/2004 | Ishio et al. | |
| 6,792,805 B2 | 9/2004 | Murata et al. | 73/514.32 |
| 6,848,310 B2 | 2/2005 | Goto et al. | 73/514.32 |
| 6,923,061 B2 | 8/2005 | Tsubaki | 73/514.32 |

(Continued)

FOREIGN PATENT DOCUMENTS

EP 00303284 A1 2/1989

(Continued)

*Primary Examiner*—Hezron Williams
*Assistant Examiner*—Tamiko D Bellamy
(74) *Attorney, Agent, or Firm*—Dickstein Shapiro LLP (57) ABSTRACT

A moving member having a plurality of moving electrodes is supported by support members at both ends thereof on a substrate surface in such a way that it can be subjected to displacement in a two-dimensional plane. A plurality of fixed electrodes are arranged to face the plurality of moving electrodes respectively, thus forming different facing areas therebetween when an input acceleration is zero. The facing areas formed between pairs of the electrodes facing each other are varied in response to the displacement of the moving member, whereby a capacitance caused by one pair of the electrodes whose facing area is relatively small is used to detect a relatively small input acceleration, and a capacitance caused by the other pair of the electrodes whose facing area is relatively large is used to detect a relatively large input acceleration.

7 Claims, 4 Drawing Sheets

U.S. PATENT DOCUMENTS

| | | | |
|---|---|---|---|
| 7,004,027 B2 | 2/2006 | Suzuki et al. | 73/514.32 |
| 7,150,192 B2 | 12/2006 | Suzuki et al. | 73/514.32 |
| 7,434,463 B2 * | 10/2008 | Suzuki | 73/500 |
| 2001/0008089 A1 * | 7/2001 | Abe et al. | 73/504.16 |

FOREIGN PATENT DOCUMENTS

| | | |
|---|---|---|
| JP | 58-91114 | 6/1983 |
| JP | 03-002569 | 7/1991 |
| JP | 06-109759 | 4/1994 |
| JP | 7-20148 | 1/1995 |
| JP | 7-140167 | 6/1995 |
| JP | 07-167885 | 7/1995 |
| JP | 07-260510 | 10/1995 |
| JP | 08-075781 | 3/1996 |
| JP | 08-136574 | 5/1996 |
| JP | 10-206457 | 8/1998 |
| JP | 2003-028741 | 1/2003 |

* cited by examiner

FIG. 4 ved Feb. 26, 2007 under U.S. Pat. No. 7,004,027,
ELECTROSTATIC-CAPACITY-TYPE ACCELERATION SENSOR AND ACCELERATION MEASURING DEVICE THEREWITH

CROSS REFERENCE TO RELATED APPLICATIONS

This is a continuation of U.S. patent application Ser. No. 11/210,966, filed Aug. 25, 2005, which is a continuation of U.S. patent application Ser. No. 10/790,440, filed Mar. 1, 2004, issued Feb. 26, 2007 under U.S. Pat. No. 7,004,027, claiming priority on Japanese Patent Application No. 2003-055562, filed on Mar. 3, 2003, the entire contents of which are incorporated herein by reference.

BACKGROUND OF THE INVENTION

1. Field of the Invention

This invention relates to electrostatic-capacity-type acceleration sensors that detect accelerations based on variations in electrostatic capacity (or capacitance), and it also relates to acceleration measuring devices using electrostatic-capacity-type acceleration sensors.

This application claims priority on Japanese Patent Application No. 2003-55562, the content of which is incorporated herein by reference.

2. Description of the Related Art

Conventionally, a typical type of an electrostatic-capacity-type acceleration sensor (as disclosed in Japanese Patent Application Publication No. Hei 7-260510) comprises a capacitance detector having a moving electrode and a fixed electrode, which are arranged opposite to each other such that a separating distance therebetween is varied in response to an input acceleration, wherein a switched-capacitor circuit converts capacitance variation due to displacement of the moving electrode into voltage variation so as to detect and output an acceleration signal, and wherein in order to broaden the detection range, a servo circuit is provided so as to hold the moving electrode at a neutral position by feeding back the acceleration signal.

Another type of the electrostatic-capacity-type acceleration sensor (as disclosed in Japanese Patent Application Publication No. Hei 10-206457) comprises a moving electrode and a fixed electrode, which are arranged on a substrate surface such that a facing area therebetween is varied in response to an input acceleration, wherein based on the capacitance realized by the moving electrode and fixed electrode, the capacitance variation due to the displacement of the moving electrode is detected so as to produce an acceleration signal.

The acceleration sensor having the servo circuit makes it possible to broaden the detection range compared with the acceleration sensor not equipped with the servo circuit because the movement of the moving electrode is limited in response to the output of the servo circuit. However, the range of the acceleration realized by the servo circuit stabilizing the moving electrode is limited by the electrostatic attraction and the weight of the moving electrode; hence, it is not easy to broaden the detection range.

The acceleration sensor in which the facing area between the moving electrode and fixed electrode is varied provides only a single kind of variation characteristic with regard to the facing area responding to the input acceleration; hence, it is not easy to broaden the detection range.

SUMMARY OF THE INVENTION

It is an object of the invention to provide a brand-new electrostatic-capacity-type acceleration sensor whose detection range can be broadened with ease.

An electrostatic-capacity-type acceleration sensor of this invention comprises a plurality of capacitance detectors having pairs of moving electrodes and fixed electrodes that are arranged to face each other on the substrate surface, wherein facing areas are varied in response to an input acceleration. Herein, the capacitance detectors are constituted such that the facing areas between the moving electrodes and fixed electrodes differ from each other when the input acceleration is zero, so that each of the capacitance detectors produces an acceleration signal in response to the capacitance variation occurring between the paired electrodes thereof.

Since the acceleration sensor employs the aforementioned constitution adapted in each of the capacitance detectors in which the facing areas between the moving electrodes and fixed electrodes differ from each other so as to produce a variety of acceleration signals in response to capacitance variations occurring between the paired electrodes, it is possible to easily broaden the overall detection range for detecting the input acceleration by simply increasing the number of the capacitance detectors installed therein, wherein it is possible to provide each capacitance detector with a specific detection range suited thereto, thus realizing a high accuracy in the detection of the acceleration.

In the above, all of the moving electrodes provided for the capacitance detectors can be integrally formed together. Thus, it is possible to improve the integration of components and parts in the manufacturing of the acceleration sensor on the substrate surface by using the modern semiconductor manufacturing technology.

Specifically, each of the capacitance detectors comprises two pairs of moving electrodes and fixed electrodes, which are arranged in such a way that the facing area between the first moving electrode and first fixed electrode increases while the facing area between the second moving electrode and second fixed electrode decreases in response to the same input acceleration, whereby it produces an acceleration signal in response to a ratio or a difference between the first capacitance actualized between the first moving electrode and first fixed electrode and the second capacitance actualized between the second moving electrode and second fixed electrode. Thus, it is possible to noticeably improve the detection sensitivity in each of the capacitance detectors because the acceleration signal can be precisely produced in response to the ratio or difference between the two types of the capacitance.

In addition, the capacitance detectors can be constituted such that one capacitance detector has a relatively small facing area between the paired electrodes so as to produce an acceleration signal in response to a relatively small input acceleration, and the other capacitance detector has a relatively large facing area between the paired electrodes so as to produce an acceleration signal in response to a relatively large input acceleration. Thus, it is possible to detect the input acceleration with a high sensitivity in a relatively broad detection range.

An acceleration measuring device of this invention comprises an electrostatic-capacity-type acceleration sensor including first and second capacitance detectors each having a pair of a moving electrode and a fixed electrode in which the facing area between the paired electrodes in the second capacitance detector is set to be larger than the facing area between the paired electrodes in the first capacitance detector when an input acceleration is zero, a first detection circuit for producing a first acceleration signal in response to capacitance variation occurring between the moving electrode and fixed electrode in the first capacitance detector, a second detection circuit for producing a second acceleration signal in response to capacitance variation occurring between the moving electrode and fixed electrode in the second capacitance detector, and a selector for selectively outputting the first acceleration signal as long as the first acceleration signal does not exceed a threshold level determined in advance and for selectively outputting the second acceleration signal when the first acceleration signal exceeds the threshold level.

The aforementioned acceleration measuring device can measure acceleration at a high accuracy in a relatively broad detection range. The threshold value set to the selector can be determined to exclude a sharp varying region in a capacitance varying characteristic established with respect to variations of the input acceleration; hence, it is possible to reliably avoid occurrence of error detection due to noise.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 1A:
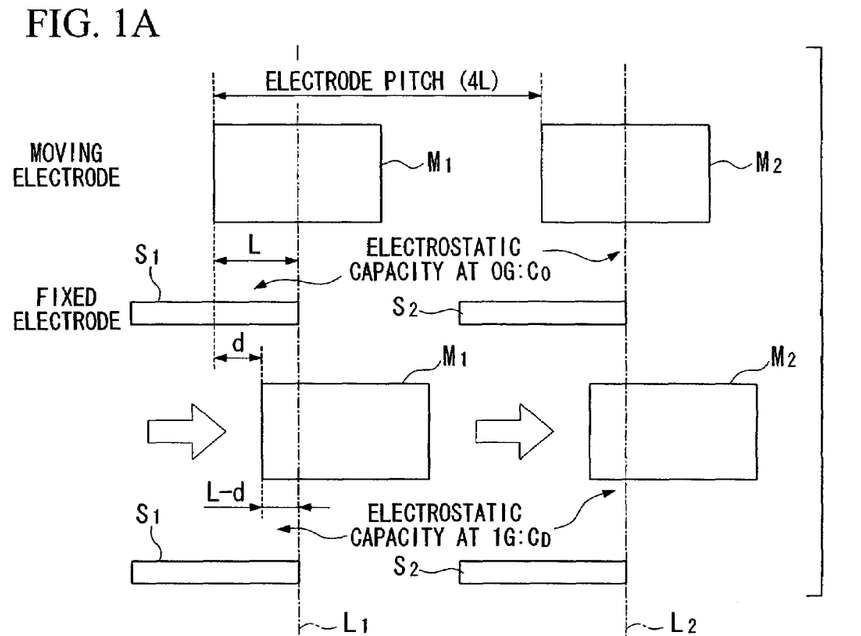
FIG. 1A shows a schematic arrangement of electrodes in a capacitance detector in which facing areas between moving electrodes and fixed electrodes are decreased in response to acceleration.
Figure 1B:
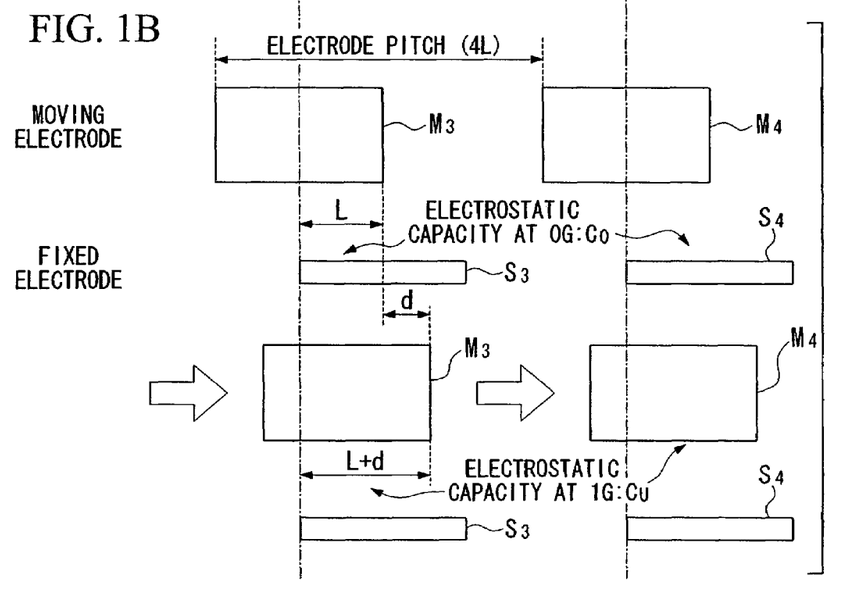
FIG. 1B shows a schematic arrangement of electrodes in a capacitance detector in which facing areas between moving electrodes and fixed electrodes are increased in response to acceleration.

FIGS. 1A and 1B show examples of arrangements of electrodes in capacitance detectors used for an electrostatic-capacity-type acceleration sensor in accordance with the preferred embodiment of the invention, wherein FIG. 1A shows an arrangement of electrodes in the facing area decreasing side, and FIG. 1B shows an arrangement of electrodes in the facing area increasing side. With reference to FIGS. 1A and 1B, the operating principle of the electrostatic-capacity-type acceleration sensor will be described.

In FIGS. 1A and 1B, each of moving electrodes $M_1$ to $M_4$ has a rectangular shape in which the length is set to '2L' and the width is set to a certain value. Herein, the moving electrodes $M_1$ and $M_3$ are arranged along a dashed line $L_1$ in parallel with a prescribed distance therebetween such that centers in their length directions match the dashed line $L_1$. Similarly, the moving electrodes $M_2$ and $M_4$ are arranged along a dashed line $L_2$ in parallel with a prescribed distance therebetween such that the centers in their length directions match the dashed line $L_2$. The dashed lines $L_1$ and $L_2$ are drawn in parallel with each other. In FIG. 1A, the moving electrodes $M_1$ and $M_2$ are arranged in parallel with an electrode pitch '4L' therebetween. In FIG. 1B, the moving electrodes $M_3$ and $M_4$ are arranged in parallel with an electrode pitch '4L' therebetween. Each of the moving electrodes $M_1$ to $M_4$ has a deadweight function, so that they can be collectively subjected to displacement in left-right directions with respect to the drawing sheet of FIGS. 1A and 1B in response to an input acceleration while maintaining the aforementioned relationship of arrangement.

In FIG. 1A, fixed electrodes $S_1$ and $S_2$ are respectively arranged under the moving electrodes $M_1$ and $M_2$, wherein the fixed electrode $S_1$ is arranged to oppositely face the left-half portion (whose length is 'L') of the moving electrode $M_1$, and the fixed electrode $S_2$ is arranged to oppositely face the left-half portion (whose length is 'L') of the moving electrode $M_2$. For the sake of convenience, the fixed electrodes $S_1$ and $S_2$ are drawn not to overlap with the moving electrodes $M_1$ and $M_2$ in FIG. 1A. Similarly, in FIG. 1B, fixed electrodes $S_3$ and $S_4$ are respectively arranged under the moving electrodes $M_3$ and $M_4$, wherein the fixed electrode $S_3$ is arranged to oppositely face the right-half portion (whose length is 'L') of the moving electrode $M_3$, and the fixed electrode $S_4$ is arranged to oppositely face the right-half portion (whose length is 'L') of the moving electrode $M_4$. For the sake of convenience, the fixed electrodes $S_3$ and $S_4$ are drawn not to overlap with the moving electrodes $M_3$ and $M_4$ in FIG. 1B.

In the above, there are provided four pairs of the fixed electrodes and the moving electrodes oppositely facing each other, namely, $M_1$-$S_1$, $M_2$-$S_2$, $M_3$-$S_3$, and $M_4$-$S_4$, each pair of which realizes a certain capacitance. At 0 G where the input acceleration is zero, each pair realizes the same capacitance '$C_0$'. Next, suppose that the input acceleration of 1 G is applied on the moving electrodes $M_1$ to $M_4$, all of which are moved rightwards as indicated by arrows in FIGS. 1A and 1B, and each of which is thus subjected to displacement in a distance 'd', the "paired" electrodes (i.e., $M_1$-$S_1$, and $M_2$-$S_2$) decrease the facing areas therebetween so that their capacitance decrease from $C_0$ to $C_D$ in FIG. 1A, while the other "paired" electrodes (i.e., $M_3$-$S_3$, and $M_4$-$S_4$) increase the facing areas therebetween so that their capacitances increase from $C_0$ to $C_U$. Therefore, when the input acceleration acting on the moving electrodes $M_1$ to $M_4$ becomes greater than 1 G, the capacitance $C_D$ further decreases, and the capacitance $C_U$ further increases.

Figure 2:
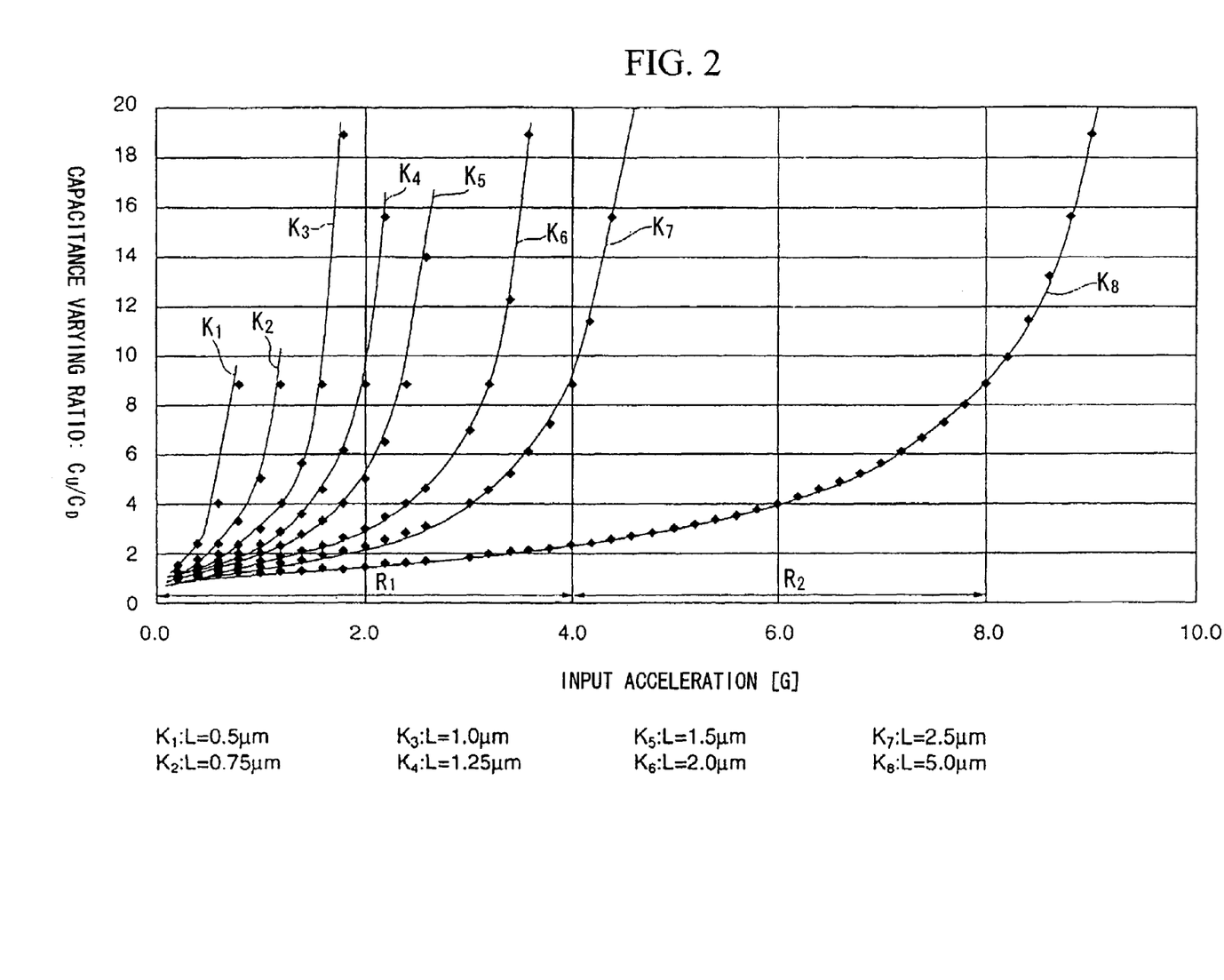
FIG. 2 is a graph showing curves representing relationships between the input acceleration and capacitance varying ratio ($C_U/C_D$) with respect to various electrode overlap values (L)

FIG. 2 is a graph showing relationships between the input acceleration and the capacitance varying ratio $C_U/C_D$ with respect to various electrode overlap values, which are related to the electrode facing area 'L'. That is, the graph of FIG. 2 provides eight curves $K_1$, $K_2$, $K_3$, $K_4$, $K_5$, $K_6$, $K_7$, and $K_8$, each of which shows the relationship between the input acceleration and the capacitance varying ratio $C_U/C_D$ with regard to the electrode overlap value L, which is set to 0.5 μm, 0.75 μm, 1.0 μm, 1.25 μm, 1.5 μm, 2.0 μm, 2.5 μm, and 5.0 μm respectively.

According to the graph of FIG. 2, as the electrode overlap value L becomes greater, it becomes possible to detect 'greater' input acceleration. For this reason, the acceleration sensor of the present embodiment comprises a plurality of capacitance detectors having different electrode overlap values, each of which is adequately constituted to detect input acceleration in a certain detection range suited thereto. That is, a relatively small input acceleration can be detected using a capacitance detector whose electrode overlap value is relatively small, and a relatively large input acceleration is detected using a capacitance detector whose electrode overlap value is relatively large. Hence, it is possible to actualize a high sensitivity in detecting acceleration in a relatively broad range of detection.

With respect to each of the aforementioned curves (e.g., K1), in order to avoid error detection due to noise, it is preferable not to use a certain region in which the capacitance varying ratio $C_U/C_D$ becomes large so as to make variation sharp.

Figure 3:
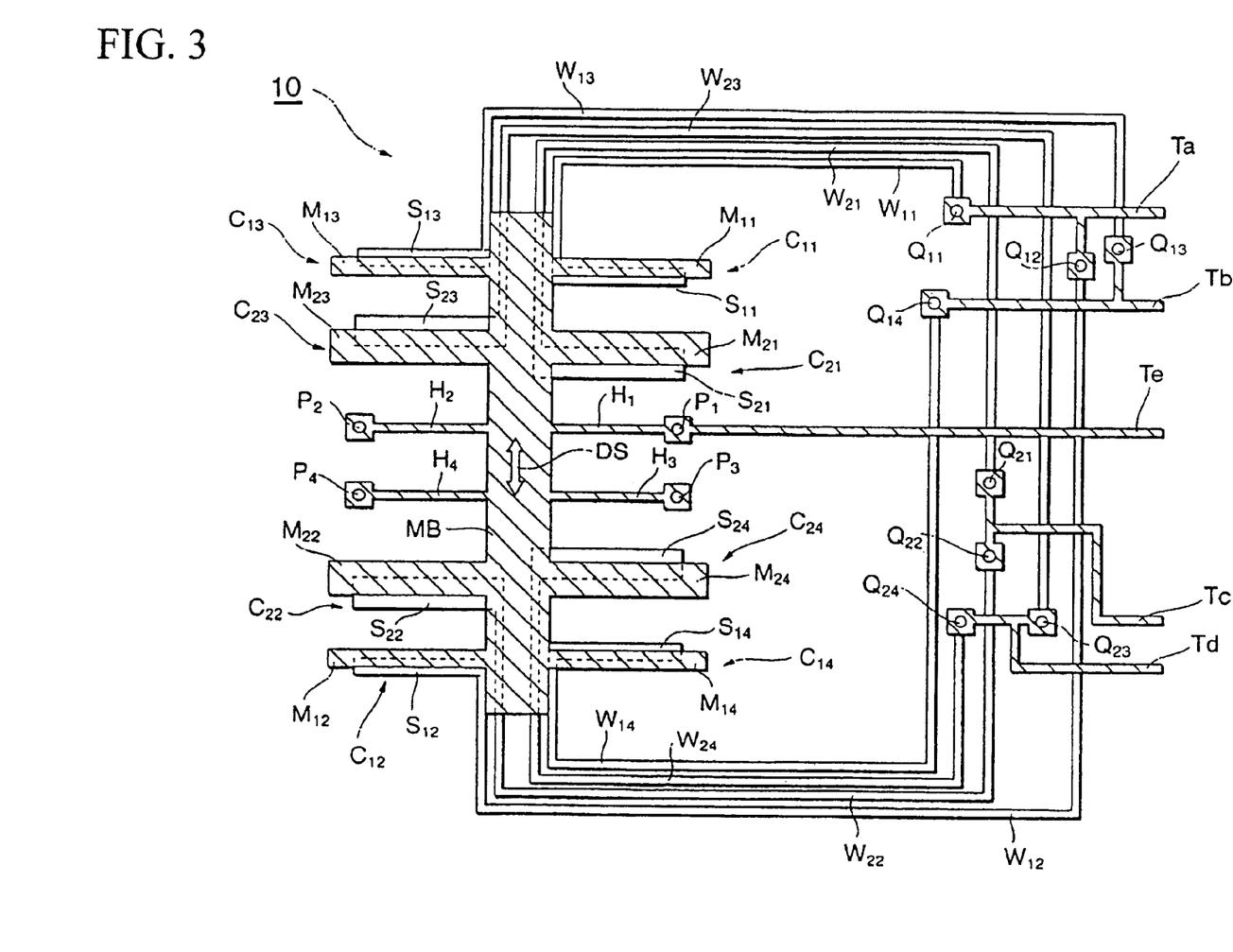
FIG. 3 is a plan view showing a layout of parts constituting an electrostatic-capacity-type acceleration sensor in accordance with a preferred embodiment of the invention.

FIG. 3 shows an electrostatic-capacity-type acceleration sensor 10 in accordance with the preferred embodiment of the invention.

In the acceleration sensor 10, a moving member MB having a deadweight function is arranged on the surface of a silicon substrate and is supported by four support members $H_1$ to $H_4$ at both sides thereof such that it can be subjected to displacement in a direction DS in parallel with the substrate surface. The ends of the support members $H_1$ to $H_4$ are fixed at prescribed positions by fixing members $P_1$ to $P_4$ respectively. Four moving electrodes $M_{11}$, $M_{21}$, $M_{24}$, and $M_{14}$ are arranged on one side of the moving member MB and are projected in parallel with the substrate surface. In addition, four moving electrodes $M_{13}$, $M_{23}$, $M_{22}$, and $M_{12}$ are arranged on the other side of the moving member MB and are projected in parallel with the substrate surface. All of the moving electrodes $M_{11}$ to $M_{14}$ have the same length projecting from the moving member MB, and all of the moving electrodes $M_{21}$ to $M_{24}$ have the same length projecting from the moving member MB. In addition, all of the moving electrodes $M_{11}$ to $M_{14}$ have the same width, and all of the moving electrodes $M_{21}$ to $M_{24}$ have the same width that is greater than the width of the moving electrodes $M_{11}$ to $M_{14}$.

All of the moving member MB, the moving electrodes $M_{11}$-$M_{14}$ and $M_{21}$-$M_{24}$, and the support members $H_1$-$H_4$ are integrally combined together as a single assembly. Such an assembly can be formed by patterning conductive layers, which are made of a semiconductor or a metal and are deposited on an insulating film covering the substrate surface, wherein after the patterning, the insulating film is removed to allow movements of the moving member MB, the moving electrodes $M_{11}$-$M_{14}$ and $M_{21}$-$M_{24}$, and the support members $H_1$-$H_4$, for example. In addition, four fixing holes are formed at four fixing positions on the insulating film covering the substrate surface and are filled with conductive plugs, made of a semiconductor or a metal, thus forming the four fixing members $P_1$ to $P_4$.

Figure 4:
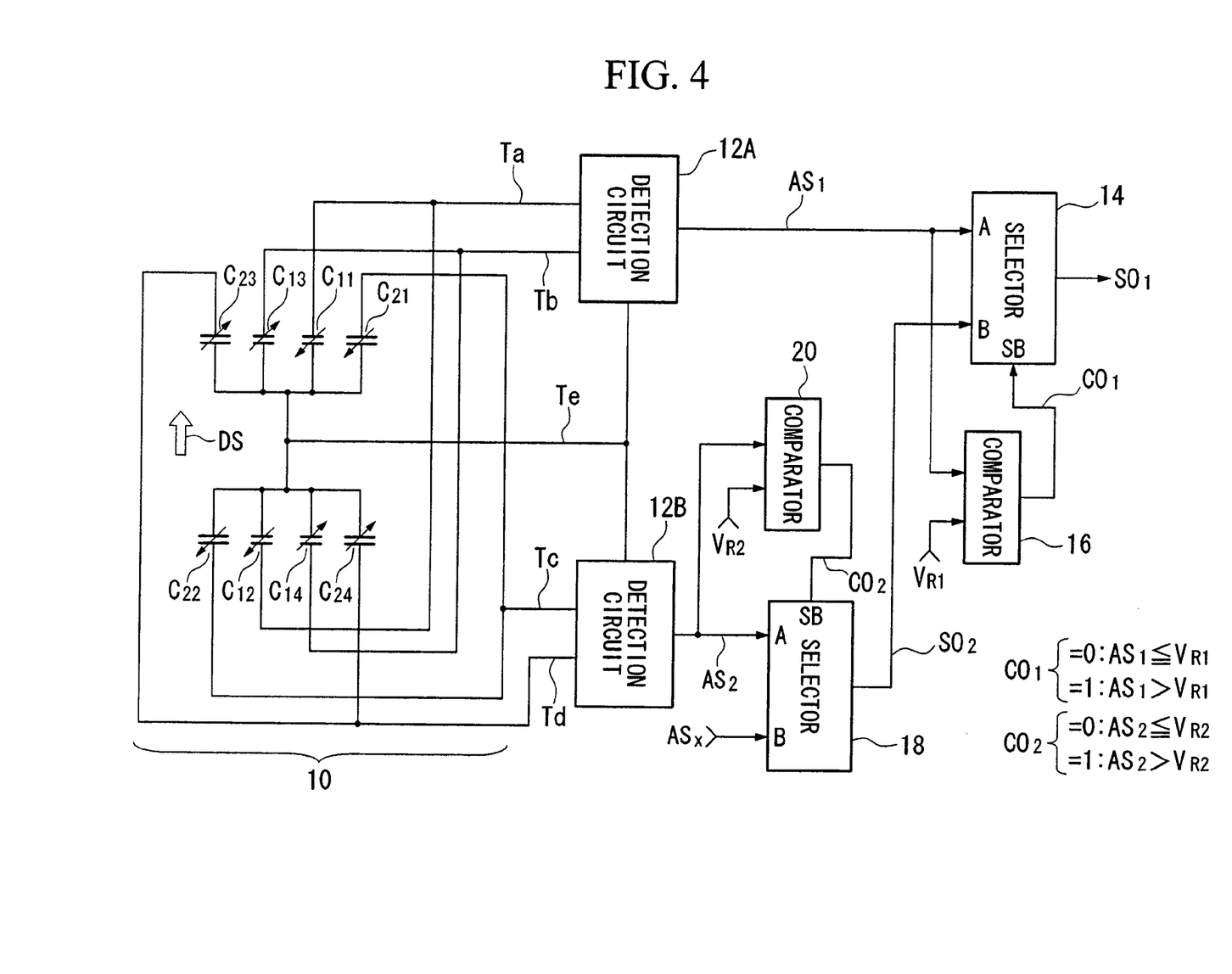
FIG. 4 is a block diagram showing an example of an acceleration measuring circuit using the electrostatic-capacity-type acceleration sensor.

Four fixed electrodes $S_{11}$ to $S_{14}$ are arranged opposite to the moving electrodes $M_{11}$ to $M_{14}$ with relatively small facing areas therebetween, thus actualizing capacitances $C_{11}$ to $C_{14}$ having substantially the same value when the input acceleration is zero. In addition, four fixed electrodes $S_{21}$ to $S_{24}$ are arranged opposite to the moving electrodes $M_{21}$ to $M_{24}$ with relatively large facing areas therebetween, thus actualizing capacitances $C_{21}$ to $C_{24}$ having substantially the same value when the input acceleration is zero. Suppose that the moving member MB is subjected to displacement in the direction DS as indicated by an arrow in FIG. 4 (i.e., a forward direction in parallel with the sheet of FIG. 4), wherein the fixed electrodes $S_{11}$, $S_{12}$, $S_{21}$, and $S_{22}$ are associated with the moving electrodes $M_{11}$, $M_{12}$, $M_{21}$, and $M_{22}$ such that the facing areas therebetween are reduced so as to decrease the capacitances $C_{11}$, $C_{12}$, $C_{21}$, and $C_{22}$ respectively, while the fixed electrodes $S_{13}$, $S_{14}$, $S_{23}$, and $S_{24}$ are associated with the moving electrodes $M_{13}$, $M_{14}$, $M_{23}$, and $M_{24}$ such that the facing areas therebetween are increased so as to increase the capacitances $C_{13}$, $C_{14}$, $C_{23}$, and $C_{24}$ respectively. In FIG. 4, the capacitances $C_{11}$-$C_{14}$ and $C_{21}$-$C_{24}$ are associated with arrows, wherein a downward slanted arrow indicates that the corresponding capacitance is decreased, and an upward slanted arrow indicates that the corresponding capacitance is increased.

The aforementioned fixed electrodes $S_{11}$-$S_{14}$ and $S_{21}$-$S_{24}$ are formed by impurity-doped regions in which conductive impurities are selectively doped onto the substrate surface. Alternatively, they are formed by patterning conductive layers, made of a semiconductor or a metal, which are deposited on an insulating film covering the substrate surface.

Wiring layers $W_{11}$-$W_{14}$ and $W_{21}$-$W_{24}$ are respectively extended from the fixed electrodes $S_{11}$-$S_{14}$ and $S_{21}$-$S_{24}$. The wiring layers $W_{11}$ and $W_{12}$ are interconnected with a detection line Ta via connection members $Q_{11}$ and $Q_{12}$ respectively. The wiring layers $W_{13}$ and $W_{14}$ are interconnected with a detection line Tb via connection members $Q_{13}$ and $Q_{14}$ respectively. The wiring layers $W_2$, and $W_{22}$ are interconnected with a detection line Tc via connection members $Q_{21}$, and $Q_{22}$ respectively. The wiring layers $W_{23}$ and $W_{24}$ are interconnected with a detection line Td via connection members $Q_{23}$ and $Q_{24}$ respectively. The support member $H_1$ is connected with a detection line Te.

The wiring layers $W_{11}$-$W_{14}$ and $W_{21}$-$W_{24}$ are formed by patterning such that their widths are reduced to be as small as possible in order to reduce parasitic capacitances thereof; the distances with the moving parts (i.e., MB, $M_{11}$-$M_{14}$, $M_{21}$-$M_{24}$) are increased to be as large as possible; and the electrode overlap values associated with the moving parts are reduced to be as small as possible. Similar to the fixed electrodes $S_{11}$-$S_{14}$ and $S_{21}$-$S_{24}$, the wiring layers $W_{11}$-$W_{14}$ and $W_{21}$-$W_{24}$ are formed by impurity-doped regions or conductive layers subjected to patterning. Eight connection holes are formed at prescribed positions on the insulating film covering the substrate surface and are filled with conductive plug, made of a semiconductor or a metal, thus actualizing the connection members $Q_{11}$-$Q_{14}$ and $Q_{21}$-$Q_{24}$. Incidentally, the connection members (e.g., $Q_{11}$) can be formed by adopting the aforementioned treatment for use in the formation of the fixing members (e.g., $P_1$).

For example, after the wiring layers $W_{11}$-$W_{14}$ and $W_{21}$-$W_{24}$ are formed as impurity-doped regions, a first wiring layer forming process is performed on the insulating layer covering the substrate surface so as to form the fixed electrodes $S_{11}$-$S_{14}$ and $S_{21}$-$S_{24}$; then, a second wiring layer forming process is performed on the insulating film covering the fixed electrodes $S_{11}$-$S_{14}$ and $S_{21}$-$S_{24}$ so as to form the moving member MB, the moving electrodes $M_{11}$-$M_{14}$ and $M_{21}$-$M_{24}$, the support members $H_1$-$H_4$, and the detection lines Ta-Td. Thus, it is possible to increase distances between the wiring layers $W_{11}$-$W_{14}$ and $W_{21}$-$W_{24}$ and the moving parts (i.e., MB, $M_{11}$-$M_{14}$, $M_{21}$-$M_{24}$); hence, it becomes possible to reduce parasitic capacitances.

FIG. 4 shows an equivalent circuit of the acceleration sensor 10 shown in FIG. 3; specifically, it shows an example of an acceleration measuring circuit using the acceleration sensor 10 shown in FIG. 3. The acceleration measuring circuit of FIG. 4 is designed to measure the input acceleration in a range between 0 G and 8 G as shown in FIG. 2, wherein the curve $K_7$ is used for the measurement of a relatively small input acceleration that ranges from 0 G to 4 G, and the curve $K_8$ is used for the measurement of a relatively large input acceleration that ranges from 4 G to 8 G Specifically, in a range $R_1$ wherein 0 G≦input acceleration≦4 G, compared with the curve $K_8$, the curve $K_7$ provides a greater value of the capacitance varying ratio $C_U/C_D$, which in turn actualizes a high accuracy in measurement. In a range $R_2$ where 4 G<input acceleration≦8

G, the curve $K_7$ includes a measurement-incapable region and is not used in measurement, whereas the curve $K_8$ is suitable in measurement. In order to avoid error detection due to noise, it is necessary not to use a sharp varying region of the curve $K_7$ with respect to the range $R_1$, and it is necessary not to use a sharp varying region of the curve $K_8$ with respect to the great input acceleration over 8 G, wherein these regions are excluded from the measurement.

A detection circuit 12A is connected with the detection lines Ta, Tb, and Te; and a detection circuit 12B is connected with the detection lines Tc, Td, and Te. Suppose that the capacitance varying characteristic of the capacitance detector, including the capacitances $C_{11}$ to $C_{14}$, against the input acceleration is shown by the curve $K_7$ shown in FIG. 2, while the capacitance varying characteristic of the capacitance detector, including the capacitances $C_{21}$ to $C_{24}$, against the input acceleration is shown by the curve $K_8$ shown in FIG. 2, for example. Herein, the capacitance varying ratio $C_U/C_D$ is calculated using $C_{11}$-$C_{14}$ and $C_{21}$-$C_{24}$ as follows:

$$\frac{C_{13}+C_{14}}{C_{11}+C_{12}} \quad \frac{C_{23}+C_{24}}{C_{21}+C_{22}}$$

With reference to the capacitance varying characteristic of the curve $K_7$, the detection circuit 12A produces an acceleration signal $AS_1$ representing the voltage related to a ratio (or a difference) between $(C_{13}+C_{14})$ and $(C_{11}+C_{12})$. With reference to the capacitance varying characteristic of the curve $K_8$, the detection circuit 12B produces an acceleration signal $AS_2$ representing the voltage related to a ratio (or a difference) between $(C_{23}+C_{24})$ and $(C_{21}+C_{22})$. The acceleration signal $AS_1$ is increased in level as the input acceleration increases from 0 G. The acceleration signal $AS_2$ is set such that it substantially matches the acceleration signal $AS_1$ in level at the input acceleration of 4 G, and it is further increased from that level as the input acceleration increases from 4 G.

A selector 14 has terminals A and B for receiving signals as well as a select terminal SB. Herein, the selector 14 selectively outputs the acceleration signal $SA_1$ when SB is low (or at '0'), while it selectively outputs a signal $SO_2$, which is output from a selector 18, when SB is high (or at '1'). A comparator 16 compares the acceleration signal $AS_1$ with reference voltage $V_{R1}$ so as to produce a comparison output $CO_1$, which is supplied to the select terminal SB of the selector 14. That is, the comparator 16 outputs $CO_1=0$ when $AS_1 \leq V_{R1}$; and it outputs $CO_1=1$ when $AS_1 > V_{R1}$.

The prescribed voltage related to the capacitance varying ratio $C_U/C_D$, which is read from the curve $K_7$ in FIG. 2 when the input acceleration is 4 G; is given as the reference voltage $V_{R1}$ supplied to the comparator 16. As a result, the selector 14 provides a selection output $SO_1$ corresponding to the acceleration signal $AS_1$, which is produced in response to the input acceleration in the range $R_1$ where 0 G $\leq$ input acceleration $\leq$ 4 G.

The selector 18 has terminals A and B for receiving signals as well as a select terminal SB. That is, the selector 18 selectively outputs the acceleration signal $SA_2$ when SB is low (or at '0'), while it selectively outputs an out-of-range signal $ASx$ representing that the input acceleration is out of the measurement range when SB is high (or at '1'). A comparator 20 compares the acceleration signal $AS_2$ with a reference voltage $V_{R2}$ so as to provide a comparison output $CO_2$ to the select terminal SB of the selector 18. That is, the comparator 20 outputs $CO_2=0$ when $AS_2 \leq V_{R2}$; and it outputs $CO_2=1$ when $AS_2 > V_{R2}$.

The prescribed voltage related to the capacitance varying ratio $C_U/C_D$, which is read from the curve $K_8$ in FIG. 2 when the input acceleration is 8 G is given as the reference voltage $V_{R2}$ supplied to the comparator 20. As a result, the selector 18 provides a selection output $SO_2$ corresponding to the acceleration signal $AS_2$, which is produced in response to the input acceleration in the range $R_2$ where 4 G < input acceleration $\leq$ 8 G In this case, the selector 14 is set so as to select the terminal B for receiving the selection output $SO_2$ of the selector 18 in response to the comparison output $CO_1$ of the comparator 16; hence, the selector 14 provides the selection output $SO_1$ corresponding to the acceleration signal $AS_2$.

When the acceleration signal $AS_2$ exceeds the reference voltage $V_{R2}$ (where $AS_2 > V_{R2}$), the comparison output $CO_2$ of the comparator 20 turns to '1'; hence, the selector 18 provides the selection output $SO_2$ corresponding to the out-of-range signal $ASx$. In this case, the selector 14 is set so as to select the terminal B for receiving the selection output $SO_2$ of the selector 18; hence, it provides the selection output $SO_1$ corresponding to the out-of-range signal $Asx$. An acceleration display (not shown) is provided to display an acceleration based on the acceleration signal $AS_1$ or $AS_2$ and to also display a message that the input acceleration is out of the measurement range in response to the out-of-range signal $ASx$.

The aforementioned acceleration measuring circuit of FIG. 4 is designed to perform measurement at a high accuracy with respect to a relatively broad range of 0 G $\leq$ input accelerations 8 G; which is realized by the combination of the aforementioned ranges $R_1$ and $R_2$. Herein, the measurement regarding the input acceleration is performed by excluding sharp varying regions of the curves $K_7$ and $K_8$ shown in FIG. 2; hence, it is possible to reliably avoid occurrence of error detection due to noise. The acceleration measuring circuit of FIG. 4 is designed selectively using two curves $K_7$ and $K_8$ within the eight curves $K_1$ to $K_8$ shown in FIG. 2. Of course, it is possible to easily modify the acceleration measuring circuit using three or more curves.

As described heretofore, an acceleration sensor of this invention is designed such that a plurality of capacitance detectors including pairs of moving electrodes and fixed electrodes in which facing areas therebetween differ from each other when the input acceleration is zero are arranged on the substrate surface, wherein each of the capacitance detectors is set to a prescribed measurement range of acceleration. Hence, by simply increasing the number of capacitance detectors, it is possible to actualize broadening of the overall detection range of acceleration for an acceleration measuring circuit; thus, it is possible to realize acceleration detection at a high sensitivity and in a relatively broad range.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. An electrostatic-capacity-type acceleration sensor comprising:
   a support member fixed at a prescribed position of a substrate;
   a moving member that is supported by the support member;
   a first moving electrode and a second moving electrode, which are fixed to the moving member;
   a first fixed electrode arranged to face with the first moving electrode; and a second fixed electrode arranged to face with the second moving electrode, wherein an overlap value (L1) representing a length of overlap between the first moving electrode and the first fixed electrode when an input acceleration is zero is less than an overlap value (L2) representing a length of overlap between the second moving electrode and the second fixed electrode when the input acceleration is zero.

2. The electrostatic-capacity-type acceleration sensor according to claim 1, wherein an acceleration (A1) detected by the first moving electrode and the first fixed electrode is equal to or smaller than an acceleration A2 detected by the second moving electrode and the second fixed electrode, where $A1 \leqq A2$.

3. An electrostatic-capacity-type acceleration sensor comprising:
at least one moving member;
at least one moving electrode that is fixed to the moving member and is subjected to displacement in synchronization with a displacement of the moving member; and
at least one fixed electrode arranged to face with the moving electrode, wherein a plurality of the moving electrodes and the fixed electrodes are respectively paired to form a plurality of capacitors (C1-C4),
wherein in response to a displacement of the moving member, the capacitors (C1, C2) are mutually varied in terms of capacitance, thus realizing a electrostatic capacity variation ratio (CU1/CD1), and the other capacitors (C3, C4) are mutually varied in terms of capacitance, thus realizing an electrostatic capacity variation ratio (CU2/CD2), so that the electrostatic capacity variation ratio (CU1/CD1) differs from the electrostatic capacity variation ratio (CU2/CD2).

4. An electrostatic-capacity-type acceleration sensor comprising:
at least one moving member;
at least one moving electrode that is fixed to the moving member and is subjected to displacement in synchronization with a displacement of the moving member; and
at least one fixed electrode arranged to face with the moving electrode, wherein a plurality of the moving electrodes and the fixed electrodes are respectively paired to form a plurality of capacitors (C1-C4),
wherein in response to a displacement of the moving member, the capacitors (C1, C2) are mutually varied in terms of capacitance, thus realizing a electrostatic capacity variation ratio (CU1/CD1), and the other capacitors (C3, C4) are mutually varied in terms of capacitance, thus realizing an electrostatic capacity variation ratio (CU2/CD2), so that the electrostatic capacity variation ratio (CU1/CD1) differs from the electrostatic capacity variation ratio (CU2/CD2);
wherein each pair of capacitors differs from each of the other capacitors in terms of the electrostatic capacity variation.

5. An acceleration measurement device comprising:
a plurality of moving electrodes, each having a same potential, which are fixed to a moving member; and
a plurality of fixed electrodes, which are respectively paired with the plurality of moving electrodes so as to form a plurality of capacitors,
wherein an overlap value (L1) representing a length of overlap between a first moving electrode and a first fixed electrode when an input acceleration is zero is less than an overlap value (L2) representing a length of overlap between a second moving electrode and a second fixed electrode when the input acceleration is zero,
wherein each of the fixed electrodes is connected with an detection circuit used for detection of a potential thereof, so that at least one detection circuit reads differential potentials of the capacitors, which are varied in response to the input acceleration,
wherein at least one capacitor produces a differential potential in response to the input acceleration, which is different from a differential potential produced by the other capacitor.

6. An electrostatic-capacity-type acceleration sensor comprising:
at least one moving member;
at least one moving electrode that is fixed to the moving member and is subjected to displacement in synchronization with a displacement of the moving member; and
at least one fixed electrode arranged to face with the moving electrode, wherein a plurality of the moving electrodes and a plurality of the fixed electrodes are respectively paired to form a plurality of capacitors,
wherein in response to a displacement of the moving member, a first pair of capacitors realizes a first electrostatic capacity variation ratio with respect to each other, and a second pair of capacitors realizes a second electrostatic capacity variation ratio with respect to each other, so that the first electrostatic capacity variation ratio differs from the second electrostatic capacity variation ratio.

7. The electrostatic-capacity-type acceleration sensor of claim 6 wherein each pair of capacitors differs from any other pair of capacitors in terms of the electrostatic capacity variation ratio.

* * * * *